(No Model.)　　　　　　H. H. KENDRICK.　　　5 Sheets—Sheet 1.
SANITARY CLOSET.

No. 577,305.　　　　　　　　　Patented Feb. 16, 1897.

WITNESSES:　　　　　　　　　　　　　INVENTOR:

(No Model.) 5 Sheets—Sheet 3.

H. H. KENDRICK.
SANITARY CLOSET.

No. 577,305. Patented Feb. 16, 1897.

WITNESSES:
C. E. Tomlinson
J. J. Laass

INVENTOR
Hiland H. Kendrick
By E. Laass
his ATTORNEY (No Model.)  5 Sheets—Sheet 4.

H. H. KENDRICK.
SANITARY CLOSET.

No. 577,305. Patented Feb. 16, 1897.

WITNESSES:
C. E. Tomlinson
J. J. Laass

INVENTOR
Hiland H. Kendrick
By E. Laass
his ATTORNEY (No Model.) 5 Sheets—Sheet 5.

H. H. KENDRICK.
SANITARY CLOSET.

No. 577,305. Patented Feb. 16, 1897.

WITNESSES:

INVENTOR
Hiland H. Kendrick
By E. Laass
his ATTORNEY

UNITED STATES PATENT OFFICE.

HILAND H. KENDRICK, OF FULTON, NEW YORK.

SANITARY CLOSET.

SPECIFICATION forming part of Letters Patent No. 577,305, dated February 16, 1897.

Application filed December 30, 1895. Serial No. 573,718. (No model.)

*To all whom it may concern:*

Be it known that I, HILAND H. KENDRICK, of Fulton, in the county of Oswego, in the State of New York, have invented new and useful Improvements in Sanitary Closets, of which the following, taken in connection with the accompanying drawings, is a full, clear, and exact description.

This invention consists in an improved construction and combination of the component parts of a dry closet which meets all sanitary requirements of that class of apparatus, and is simple in construction and very convenient and efficient in its operation, all as hereinafter more fully described, and specifically set forth in the claims.

Figure 1:
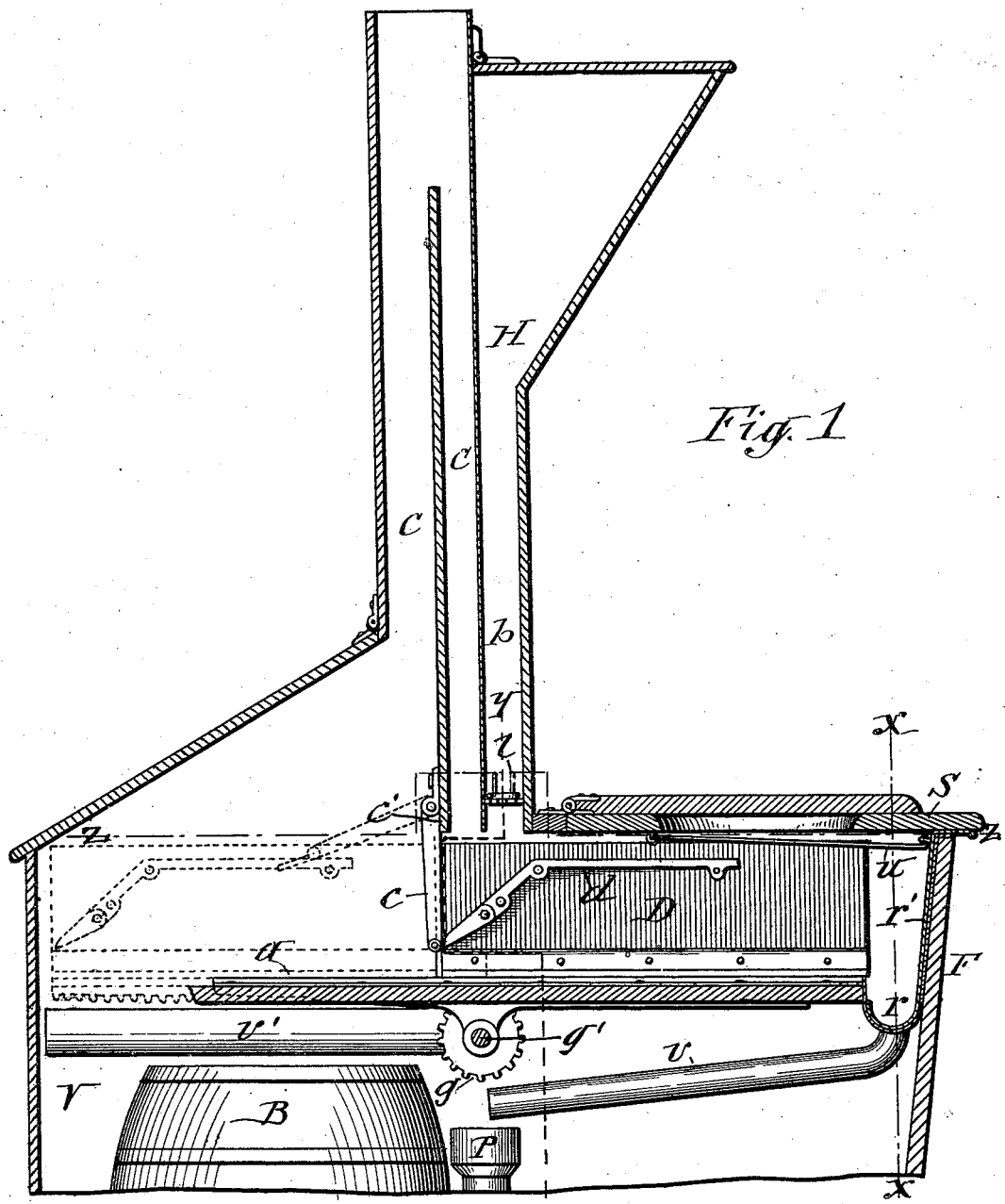
Figure 2:
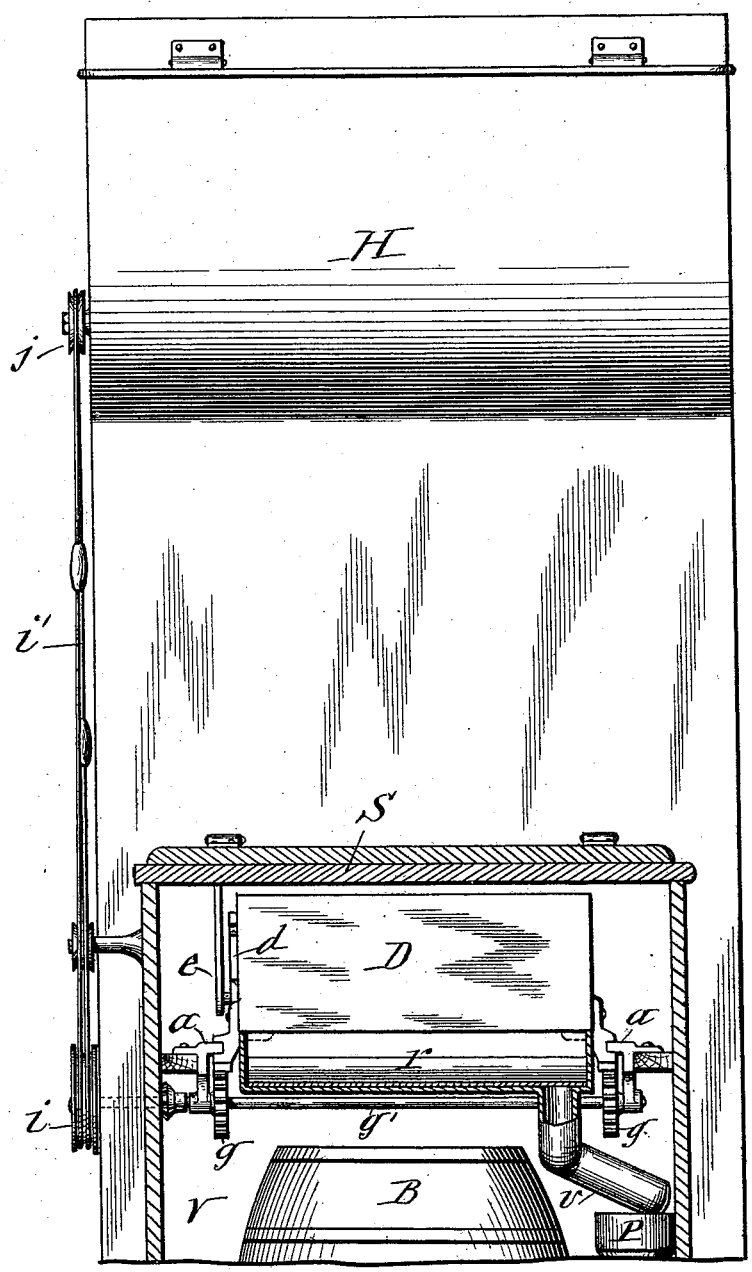
Figure 3:
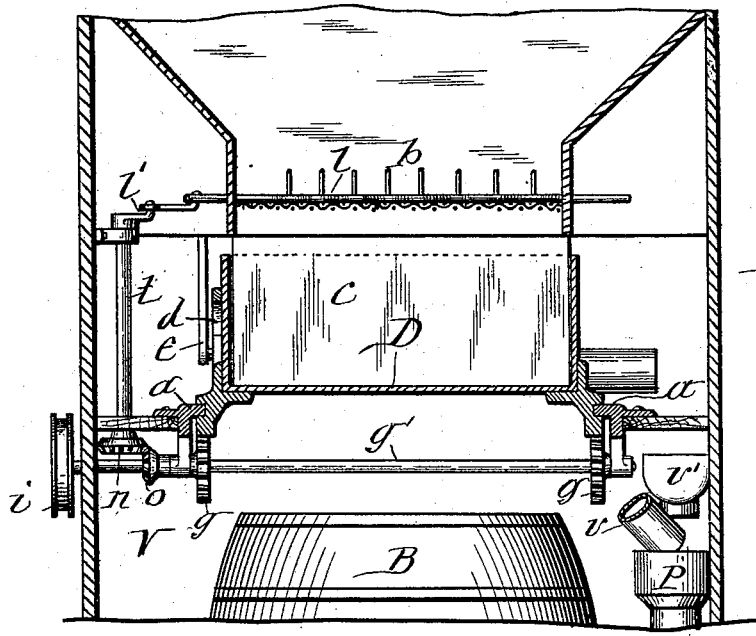
Figure 4:
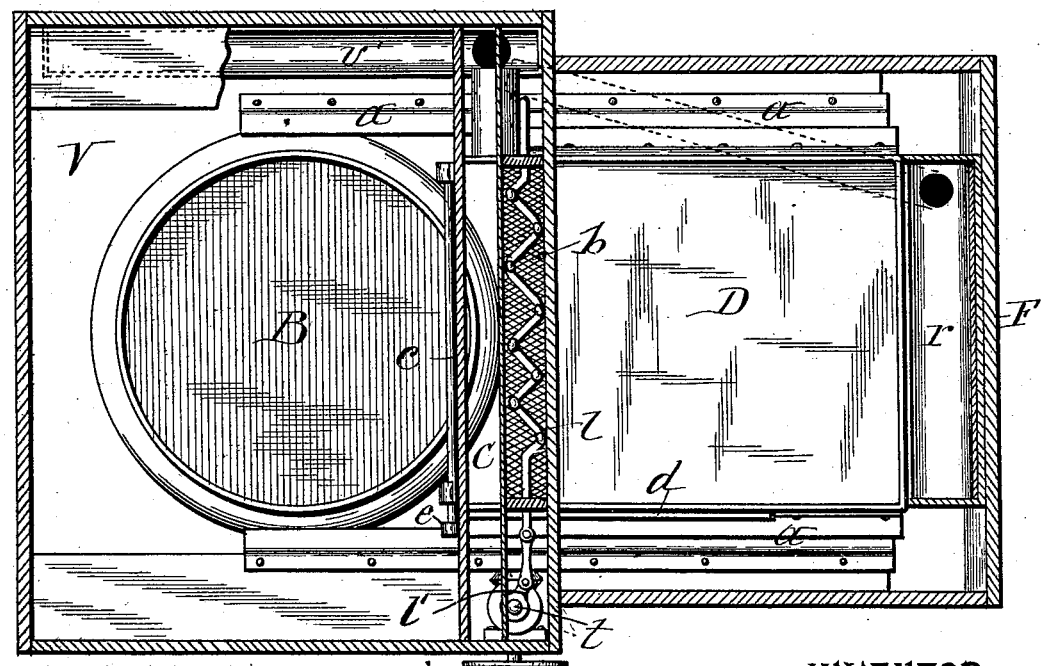
Figure 5:
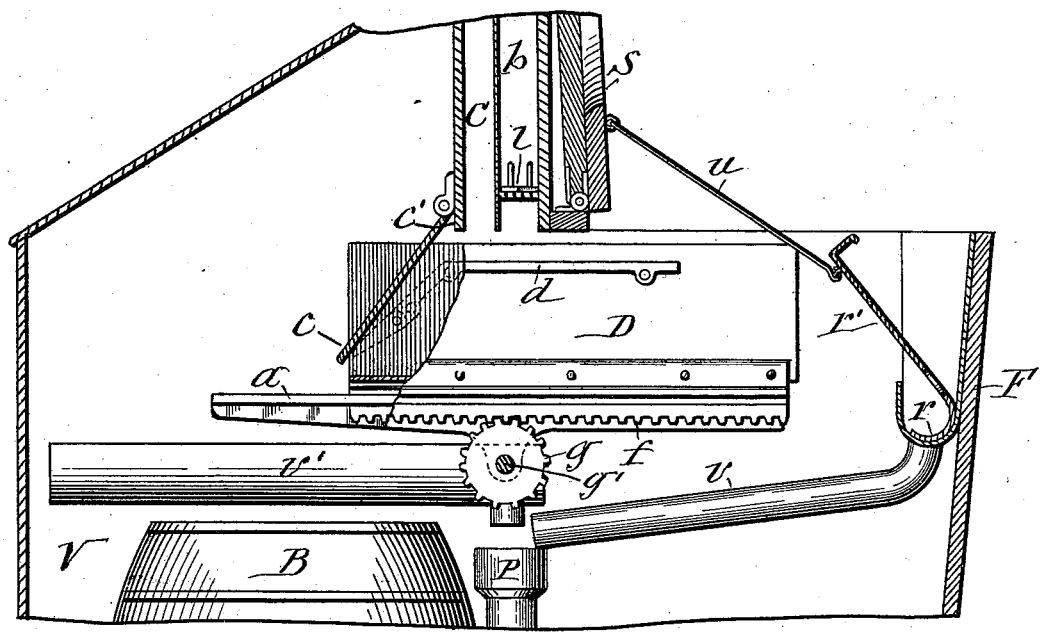
Figure 6:
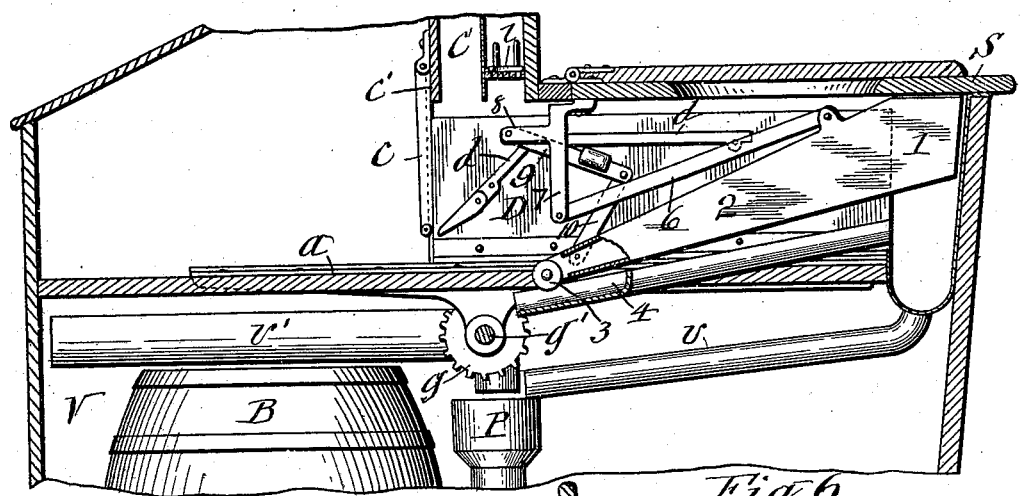
Figure 7:
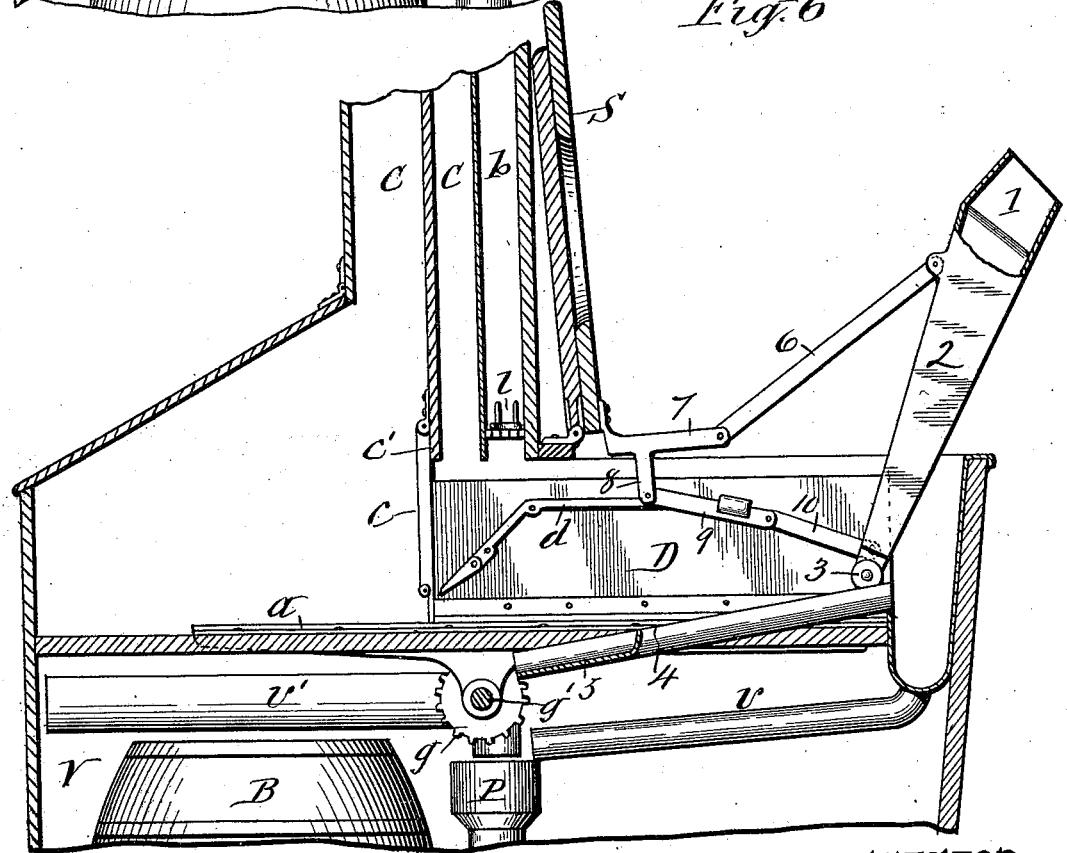

In the annexed drawings, Figure 1 is a vertical longitudinal section of a dry closet embodying my invention. Figs. 2 and 3 are vertical transverse sections, respectively, on lines X X and Y Y in Fig. 1, viewed toward the rear of the apparatus. Fig. 4 is a horizontal transverse secton on line Z Z in Fig. 1. Fig. 5 is a vertical longitudinal section showing the seat turned on its hinges to a raised position, and Figs. 6 and 7 are vertical sectional views of the urinal attachment.

Similar letters and numerals of reference indicate corresponding parts.

S denotes the seat, which is hinged at its rear edge in the usual manner. Immediately under this seat is a drawer D, which slides on guides $a$ $a$ and is open at both ends. At the back of the seat is located the discharge-spout $b$ of the hopper H, designed to contain suitable disinfectant dust, preferably ground land-plaster, and adjacent to this spout is the ventiduct C for the escape of air from the space under the seat and from the vault V back of said space. To the back of the ventiduct C is hinged the scraper $c$, the hinge of which is a sufficient distance from the bottom of said back to form an abutment $c'$, which prevents said scraper from swinging beyond a vertical position. Said scraper closes the rear end of the drawer D when the latter is placed under the seat S, as shown in Fig. 1 of the drawings, and said scraper is shaped to enter into the drawer and scrape the interior thereof during the forward movement of the drawer to its position under the seat. To the side of the drawer is attached a track $d$, the front and main portion of which is nearly or quite horizontal and the rear end portion is inclined and formed with a hinge, as shown at $d'$, to allow the extremity $d''$ of said portion to rise and fall.

The scraper $c$ is fastened to its shaft, and to the end of the latter is attached an arm $e$, the free end of which is in the path of the track $d$. The result is that when the drawer is directly under the seat the scraper $c$ is suspended in a vertical position across the rear end of the drawer, and in moving the drawer rearward from under the seat the free end of the arm $e$ is caused to ride on the track $d$ and thereby lifts the scraper $c$, as indicated by dotted lines in Fig. 1 of the drawings.

The track $d$ is of such a length as to allow the scraper $c$ to drop onto the bottom of the interior of the drawer when the latter has arrived at its rearmost position. Then in the reverse movement of the drawer toward the seat the scraper is caused to scrape the interior of drawer and remove the contents thereof into the tank or barrel B, placed in the vault V. In the latter part of said reverse movement of the drawer the free end of the arm $e$ lifts the hinged end portion of the track $d$ and passes back of the same, so as to again allow it to mount the track in the next rearward movement of the drawer.

To the drawer are attached the racks $f f$, with which engage the pinions $g g$, attached to a shaft $g'$, to the end of which is secured a sheave $i$. Around this sheave runs an endless chain or cord $i'$, which passes over a sheave $j$, pivoted to a suitable support above the seat. Said endless chain or cord is to be operated by a person drawing it up and down and thereby causing the drawer D to move to and from under the seat.

In the discharge-spout of the hopper H is an agitator $l$ for stirring the dust therein and causing the required amount of dust to descend into the drawer D. The agitator herein shown is of the form of a reciprocating rack having teeth projecting upward from it.

In order to cause the agitator to operate automatically and simultaneously with the movement of the drawer D, I connect said agitator to a crank $l'$, attached to a vertical shaft $t$, to the lower end of which is secured a bevel-pinion $n$, meshing with a pinion $o$ on the shaft $g'$, as shown in Fig. 3 of the drawings. The pinions $n$ and $o$ are so proportioned to each other as to prevent excessive motion of the agitator $l$ and undue delivery of dust from the hopper H. To separate as much as possible the liquid from the solid matter, I place across the front of and beneath the drawer D a gutter $r$ for the reception of the liquid deposited by the person using the closet. Over this gutter I place a dashboard or shed $r'$, which is suitably hinged at its lower edge to allow the upper portion thereof to be swung to and from the front portion F of the inclosing frame. A rod $u$ connects the top of the said shed to the seat S, so as to cause the shed to be thrown rearward and into an inclined position to the gutter $r$ when the seat S is raised, as illustrated in Fig. 5 of the drawings, in which position said dashboard forms a hopper for the reception of slops.

A conduit $v$ leads from the gutter $r$ to the drain-pipe P. Along the line of the travel of the drawer D over the vault $v$ is another gutter $v'$, arranged to catch the drippings from the drawer and conduct them to the drain-pipe P.

In Figs. 6 and 7 of the drawings I have shown an additional equipment for my improved closet. It consists of the urinal 1 of the form of a trough arranged transversely beneath the front portion of the seat S and provided at each end with a limb 2, to the end of which is pivoted a roller 3, which rides on an inclined track 4. One of the limbs 2 is of the form of a spout, which is open to the trough 1 and to a gutter 5, which latter extends along the side of the track 4 and leads to the pipe P. To each limb 2, adjacent to the trough, is pivoted a lever 6, by which said limb is connected with an arm 7, rigidly attached to the under side of the seat S. A secondary arm 8, attached to the said seat adjacent to the arm 7, is connected by toggle-levers 9 and 10 to the limb 2, at the end of which the roller 3 is pivoted.

By the described connection of the aforesaid limbs 2 2 with the seat S the urinal is held normally under the seat when the latter is closed, as shown in Fig. 6 of the drawings, and in raising the seat to its open position the urinal is thrown into an upright position, as illustrated in Fig. 7 of the drawings.

What I claim as my invention is—

1. In combination, with the seat, a drawer movable to and from under said seat, and open at both ends, and a movable scraper closing the rear end of the drawer when under the seat, and mechanism lifting said scraper during the movement of the drawer from the seat and dropping the scraper onto the drawer when in its removed position and retaining it in its dropped position during the movement of the drawer to the seat as set forth.

2. In combination with the seat, a drawer movable to and from under said seat and open at both ends, a scraper movable to and from the rear end of the drawer, a track attached to the side of the drawer and lifting the scraper during the movement of the drawer from the seat and dropping the scraper at the end of said movement of the drawer as set forth.

3. In combination with the seat, a drawer movable to and from under said seat and having both ends open, a vertically-yielding scraper at the rear end of said drawer and conformed to the interior thereof, and a track attached to the side of the drawer and composed of a horizontal main portion and an inclined rear end portion provided with a joint to allow the extremity thereof to rise and fall, said track lifting the scraper during the rearward movement of the drawer and allowing said scraper to drop into the drawer when in its extreme rear position.

4. In combination with the seat and a drawer movable to and from under said seat and open at both ends, a dust-hopper over the rear end of the drawer and communicating therewith, an agitator in said hopper, and a vertically-movable scraper entering the drawer in its movement toward the seat as set forth.

5. In combination with the seat, a drawer movable to and from under said seat and open at both ends, a vertically-movable scraper over the rear end of the drawer and entering the same, a track on the side of the drawer lifting the scraper during the rearward movement of the drawer and dropping the scraper into the drawer in the forward movement thereof, a dust-hopper over the rear end of the drawer, an agitator in said hopper, racks attached to the drawer, pinions meshing with the racks, mechanisms transmitting motion from the shaft of said pinions to the aforesaid agitator, and manually-operated mechanism operating the pinions and thereby moving the drawer, agitator and scraper in the order specified.

6. In combination with the seat and the drawer movable to and from under said seat, a drain-pipe for liquid, a gutter extending across the front of the drawer and continued along the side of the path of the drawer and leading to the drain-pipe, as set forth and shown.

7. In combination with the seat and the drawer movable to and from under said seat, a drain-pipe for liquid, and a gutter extending along the side of the path of the drawer and leading to the said drain-pipe as set forth.

In testimony whereof I have hereunto signed my name this 9th day of December, 1895.

HILAND H. KENDRICK. [L. S.]

Witnesses:
LANGDON C. FOSTER,
CALVIN R. DINES.